Patented Feb. 16, 1926.

1,573,039

UNITED STATES PATENT OFFICE.

WILLIAM H. BUSCHELL, OF INDIANAPOLIS, INDIANA, ASSIGNOR OF ONE-FOURTH TO J. D. EASTMAN, OF INDIANAPOLIS, INDIANA.

PROCESS OF MENDING RUBBER ARTICLES.

No Drawing.   Application filed November 21, 1924.   Serial No. 751,400.

*To all whom it may concern:*

Be it known that I, WILLIAM H. BUSCHELL, a citizen of the United States, and a resident of Indianapolis, county of Marion, and State of Indiana, have invented a certain new and useful Process of Mending Rubber Articles; and I do hereby declare that the following is a full, clear, and exact description thereof.

The object of this invention and process is to improve the method of repairing rubber articles, and particularly in the superior result obtained.

In the process heretofore employed for this purpose, it has been customary to place a patch under or over the cut or place in the rubber article which is to be repaired, filling the cut or worn place with rubber gum and vulcanizing the patch, gum and adjacent part of the rubber article. In carrying out such old process, it has been necessary to cleanse the rubber article at the cut, puncture or part to be repaired, with gasoline, benzol or other cleanser, and buff or roughen the surface around the puncture and then using repair material, such as sheets of vulcanized rubber compounded by placing a strip of it under or over the part of the rubber article to be repaired, and holding the same under pressure and heat for a time according to the character of the repair material.

The result of this old process has been that it produced a clumsy repair, as the added layer or patch of material increased the thickness at some points greater than the thickness at other points of the rubber article being repaired. The increased thickness prevents elasticity under the patch, resulting in an unequalized strain. Also the added patch and the rubber article are not entirely homogeneous and the repair is, therefore, temporary.

One feature of this invention is that it renders the addition of the patch or layer on the rubber article being repaired needless. Also the article after it is repaired, is of the same thickness at all points and is smooth and looks well. This mending process is like the healing of a person's skin after it has been cut and the adjacent edges of the cut have grown together. It is a healing of the rubber article rather than a patching of it.

The first material step in the new process after cleaning the portion of the rubber article that is to be repaired, is to heat said portion whether it be a cut, puncture, rim cut, blow-out or worn-out place, around the cut or puncture for one or two minutes. The next step in the process is to apply a chemical compound to the portion to be repaired, on and around the puncture or cut, which compound softens or devulcanizes the rubber so as to cause or permit a fusing of the rubber at the cut or puncture. The next step in the process is to place the portion of the article being repaired, after said chemical compound has been applied, under pressure and heat in order to cause the severed edges of the rubber article to fuse together.

The chemical compound used in this process is obtained by a natural valence combination of turpentine and sulphur or like compound or homogeneous ingredients, or turpentine or its homologue may be used alone, although said compound is preferable. If a paste is desired for use in carrying out this process, it may be made by mixing the above material and ingredients with paraffin or its homologue sufficient to produce the desired paste.

This process is of particular value in repairing a rubber article which has been severed, cut, punctured or the like where the edges of the opening in the rubber are comparatively close together so that they can fuse together when treated, as above stated.

When treated by this process, the adjacent edges of the cut fuse or grow together so that the rubber at the cut heals and it is as strong at the cut after it has been healed as elsewhere, for the rubber being treated is necessarily homogeneous because it is in the same article and portion of the article. This makes an unusually strong repair for the foregoing reasons. Also the repaired rubber is of uniform thickness and is smooth and may be as thin and flexible as the other portion of the rubber article. No patch is apparent and the repair is practically invisible.

The invention claimed is:

1. In the process of repairing vulcanized rubber articles, applying to the portion to be repaired a chemical compound which softens and devulcanizes the rubber, and subjecting the portion being repaired to heat and pressure, whereby the adjacent parts thereof will be fused together.

2. The process of repairing vulcanized rubber articles, which process consists in heating the portion of the article to be repaired, applying a chemical compound thereto which softens and devulcanizes the rubber, and subjecting the same to heat and pressure, substantially as set forth.

3. The process of repairing rubber articles, which process consists in heating the portion of the rubber article to be repaired, applying to said part a chemical compound containing turpentine or its homologue, and subjecting the same to heat and pressure.

4. The process of repairing rubber articles, which process consists in heating the portion of the rubber article to be repaired, applying to said part a chemical compound obtained by a natural valence combination of turpentine and sulphur, and subjecting the same to heat and pressure.

In witness whereof, I have hereunto affixed my signature.

WILLIAM H. BUSCHELL.